United States Patent
Tago et al.

(10) Patent No.: US 9,813,595 B2
(45) Date of Patent: Nov. 7, 2017

(54) CAMERA MODULE INCLUDING MULTILAYER BASE BODY, IMAGE SENSOR IC, LENS UNIT, PERIPHERAL CIRCUIT COMPONENTS, AND CONNECTOR ELEMENT AND ELECTRONIC DEVICE INCLUDING SAME

(71) Applicant: Murata Manufacturing Co., Ltd., Nagaokakyo-shi, Kyoto-fu (JP)

(72) Inventors: Shigeru Tago, Nagaokakyo (JP); Hirofumi Shinagawa, Nagaokakyo (JP); Jerry Hsieh, Nagaokakyo (JP); Satoshi Sasaki, Nagaokakyo (JP); Jun Sasaki, Nagaokakyo (JP); Nobuo Ikemoto, Nagaokakyo (JP); Yuki Wakabayashi, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 14/840,103

(22) Filed: Aug. 31, 2015

(65) Prior Publication Data
US 2015/0373238 A1    Dec. 24, 2015

Related U.S. Application Data

(63) Continuation of application No. PCT/JP2014/055912, filed on Mar. 7, 2014.

(30) Foreign Application Priority Data

| Mar. 7, 2013 | (JP) | ................................. 2013-044844 |
| May 30, 2013 | (JP) | ................................. 2013-114136 |
| Jan. 30, 2014 | (WO) | .................. PCT/JP2014/052026 |

(51) Int. Cl.
H04N 5/225    (2006.01)

(52) U.S. Cl.
CPC ......... *H04N 5/2253* (2013.01); *H04N 5/2254* (2013.01); *H04N 5/2257* (2013.01)

(58) Field of Classification Search
CPC .. H04N 5/2253; H04N 5/2254; H04N 5/2257; G02B 13/0015; G02B 13/001;
(Continued)

(56) References Cited

U.S. PATENT DOCUMENTS

| 7,498,556 B2 * | 3/2009 | Yang ................. H01L 27/14618 250/208.1 |
| 2004/0189862 A1 * | 9/2004 | Gustavsson ........ G02B 13/0015 348/376 |

(Continued)

FOREIGN PATENT DOCUMENTS

| JP | 2001-078064 A | 3/2001 |
| JP | 2007-165460 A | 6/2007 |

(Continued)

OTHER PUBLICATIONS

Official Communication issued in International Patent Application No. PCT/JP2014/055912, dated May 27, 2014.

*Primary Examiner* — Pritham Prabhakher
(74) *Attorney, Agent, or Firm* — Keating & Bennett, LLP

(57) ABSTRACT

A camera module includes a multilayer base body including a first mounting portion, a second mounting portion, and a connecting portion. The first mounting portion and the second mounting portion are connected to the connecting portion. A connector element is arranged in the second mounting portion. The first mounting portion includes a cavity, and a penetration hole penetrating from the cavity to one surface of the first mounting portion. An image sensor IC is arranged in the cavity, and the lens unit is arranged on the one surface of the first mounting portion at a location at or near the penetration hole. Peripheral circuit components (Continued)

and conductor patterns are mounted to or incorporated in the first mounting portion.

20 Claims, 12 Drawing Sheets

(58) Field of Classification Search
CPC ............ H01L 31/0203; H01L 31/0232; H01L 2224/48227; H01L 2224/48091; H01L 2224/48472; H01L 2224/49171; H01L 2924/00014; H01L 2924/3025; H01L 2924/00; H01L 27/14618; G03B 17/02
USPC .......................................................... 348/374
See application file for complete search history.

(56) References Cited

U.S. PATENT DOCUMENTS

| | | | | |
|---|---|---|---|---|
| 2005/0104991 | A1* | 5/2005 | Hoshino | H04N 5/2253 348/340 |
| 2005/0285973 | A1* | 12/2005 | Singh | H01L 27/14618 348/374 |
| 2006/0062100 | A1* | 3/2006 | Takahashi | H04N 5/2254 369/44.11 |
| 2008/0191335 | A1* | 8/2008 | Yang | H01L 21/6835 257/680 |
| 2008/0224248 | A1* | 9/2008 | Yang | H01L 27/14618 257/433 |
| 2013/0026591 | A1 | 1/2013 | Iwafuchi | |
| 2014/0036218 | A1* | 2/2014 | Yu | H04N 5/2257 349/200 |
| 2014/0041214 | A1* | 2/2014 | Barlow | H05K 3/0052 29/841 |
| 2014/0043496 | A1* | 2/2014 | Azuma | H04N 5/2254 348/208.7 |
| 2014/0055651 | A1* | 2/2014 | Chen | H04N 5/335 348/294 |
| 2014/0098208 | A1 | 4/2014 | Makino | |

FOREIGN PATENT DOCUMENTS

| | | |
|---|---|---|
| JP | 2009-201000 A | 9/2009 |
| JP | 2011-233716 A | 11/2011 |
| JP | 2013-005047 A | 1/2013 |
| JP | 2013-030526 A | 2/2013 |
| WO | 2011/043382 A1 | 4/2011 |

* cited by examiner

CAMERA MODULE INCLUDING MULTILAYER BASE BODY, IMAGE SENSOR IC, LENS UNIT, PERIPHERAL CIRCUIT COMPONENTS, AND CONNECTOR ELEMENT AND ELECTRONIC DEVICE INCLUDING SAME

BACKGROUND OF THE INVENTION

1. Field of the Invention

The present invention relates to a camera module including a lens unit, an image sensor IC, and peripheral circuit components that are connected to the lens units and the image sensor IC and that have predetermined functions, and further relates to an electronic device including the camera module.

2. Description of the Related Art

At present, most portable devices, such as cellular phones and PDAs, have a photographing function. Camera modules for realizing the function of photographing are generally constituted as disclosed in Japanese Unexamined Patent Application Publication No. 2007-165460 and No. 2011-233716.

Each of the camera modules disclosed in Japanese Unexamined Patent Application Publication No. 2007-165460 and No. 2011-233716 includes a lens unit, an image sensor IC, and peripheral circuit components connected to the lens unit and the image sensor IC. The peripheral circuit components are mounted to or incorporated in a multilayer substrate. The multilayer substrate is a rigid substrate, and the image sensor IC is mounted to a surface of the multilayer substrate. The image sensor IC is mounted with its light receiving element directed to the side oppositely away from the multilayer substrate. The lens unit is arranged on the same side as the surface of the multilayer substrate, to which the image sensor IC is mounted, such that a lens is spaced from a light receiving surface of the image sensor IC by a predetermined distance.

Thus, the related-art camera module has a structure that the lens unit, the image sensor IC, and the rigid multilayer substrate including the peripheral circuit components mounted thereto are successively arrayed in the thickness direction of the multilayer substrate.

In the related-art camera modules disclosed in Japanese Unexamined Patent Application Publication No. 2007-165460 and No. 2011-233716, however, because the lens unit, the image sensor IC, and the multilayer substrate are successively arrayed in the thickness direction of the multilayer substrate, the height of the camera module in its entirety is increased, and reduction of the height is not easy to realize.

When the above-mentioned type of camera module is connected to a mother board of a portable device, the camera module is directly mounted onto the mother board in some cases, and is externally connected by employing a separate connection means in other cases. The connecting means is generally a flexible cable.

When the camera module is directly mounted onto the mother board, the thickness of the portable device is increased because the thicknesses of the mother board and the camera module are added. Furthermore, a mounting region for the camera module has to be secured on the mother board. Moreover, other circuit patterns to be disposed on the mother board are limited by the mounting region for the camera module.

When the camera module is connected by employing the flexible cable, a connecting portion is susceptible to breakage due to bending or warping because the rigid camera module and the soft flexible cable are connected to each other.

SUMMARY OF THE INVENTION

Accordingly, preferred embodiments of the present invention provide a camera module that has a relatively low height and that is resistant to being damaged due to bending, warping, etc., and an electronic device including the camera module.

A camera module according to a preferred embodiment of the present invention includes a multilayer base body that is in the form of a flat film, and that includes a lamination including a plurality of flexible base material layers, an image sensor IC including a light receiving element, a lens unit that condenses light to the light receiving element, peripheral circuit components that are connected to the image sensor IC and the lens unit, and a connector element for connection to the outside.

The multilayer base body is configured such that a first mounting portion, a second mounting portion, and a connecting portion interconnecting the first mounting portion and the second mounting portion are integrated together when looked at in a plan view. The multilayer base body includes a cavity in one principal surface of the first mounting portion, and a penetration hole that penetrates from an inner bottom surface of the cavity to the other principal surface of the first mounting portion. The image sensor IC is arranged in the cavity with the light receiving element directed toward the other principal surface of the first mounting portion. The lens unit is arranged at the other principal surface side of the multilayer base body to be optically coupled to the light receiving element through the penetration hole. At least one of the peripheral circuit components is incorporated in the first mounting portion. The connector element is arranged in the second mounting portion.

With the features described above, the first mounting portion including the image sensor IC, the lens unit, and the one or more peripheral circuit components, and having the imaging function, and the second mounting portion including the connector element for connection to the outside are connected to each other by the connecting portion such that the first mounting portion, the second mounting portion, and the connecting portion are integrally defined by the multilayer base body. Therefore, durability of the camera module against bending and warping is increased. Moreover, the peripheral circuit components are arranged in surrounding relation to the image sensor IC and the lens unit. As a result, the height of the camera module is reduced. In addition, since the one or more peripheral circuit components are arranged inside the first mounting portion, the strength of the first mounting portion is increased, and the mounted positions of the image sensor IC and the lens unit are prevented suppressed from being broken due to bending or warping stress.

In the camera module according to a preferred embodiment of the present invention, preferably, the plural flexible base material layers are made of thermoplastic resin, and the multilayer base body is integrally formed by stacking and pressure-bonding the plural flexible base material layers without disposing an adhesive layer between the flexible base material layers.

With the features described above, the structure of the multilayer base body is simplified, and the thickness is reduced because the multilayer base body is formed by stacking and pressure-bonding the flexible base material layers. Moreover, since no adhesive layers are disposed, stress is less apt to generate between the layers, and reliability is improved.

In the camera module according to a preferred embodiment of the present invention, preferably, a cover member covering an opening of the cavity is arranged in the first mounting portion.

With the feature described above, light that would otherwise enter the opening of the cavity from the outside is blocked. As a result, a light shielding effect by the cover member is further obtained in addition to a light shielding effect that is obtained by arranging the image sensor IC in the cavity.

In the camera module according to a preferred embodiment of the present invention, preferably, the first mounting portion is thicker than the connecting portion.

With the feature described above, since the first mounting portion is relatively thick and the connecting portion is relatively thin, the strength of the first mounting portion is further increased while the connecting portion is given with flexibility.

In the camera module according to a preferred embodiment of the present invention, preferably, at least one of the peripheral circuit components is incorporated in the first mounting portion at a position closer to the connecting portion than a position of the cavity.

With the feature described above, the strength of the first mounting portion in a region where it is more likely subjected to stress upon bending and warping of the connecting portion is increased. Accordingly, the durability against the bending and the warping is increased, and the ability of protection for the image sensor IC is also improved.

In the camera module according to a preferred embodiment of the present invention, preferably, the peripheral circuit component is incorporated in the first mounting portion near a boundary surface between the flexible base material layers, which are in common to both the first mounting portion and the connecting portion, and the flexible base material layers, which are not in common to both the first mounting portion and the connecting portion. In particular, the peripheral circuit component is preferably incorporated in a state straddling or contacting the boundary surface.

With the features described above, the strength of the first mounting portion in a region where it is most likely subjected to stress upon bending and warping of the connecting portion is increased. Accordingly, the durability against the bending and the warping is increased, and the ability of protection for the image sensor IC is also improved. Furthermore, since the peripheral circuit component is disposed in the state straddling the boundary surface, progress of interlayer peeling in the boundary surface is prevented. It is hence possible to significantly reduce or prevent the occurrence of the problem, for example, that outside light enters an imaging zone, e.g., an optical path, through a portion where the interlayer peeling has occurred, and that a ghost is generated in a camera image. Alternatively, since the peripheral circuit component is incorporated in the state contacting the boundary surface, the strength of the first mounting portion in the region where it is most likely subjected to stress upon bending and warping of the connecting portion is increased.

In the camera module according to a preferred embodiment of the present invention, preferably, at least one of the peripheral circuit components is incorporated in the first mounting portion at a position opposing to the image sensor IC in a thickness direction of the multilayer base body.

With the feature described above, the shape of a bottom surface of the cavity is prevented from being changed due to pressure and heat that are applied when the image sensor IC is mounted. As a result, the light receiving surface of the image sensor IC is able to be mounted to the multilayer base body with high parallelism, and optical characteristics of the camera module are improved.

In the camera module according to a preferred embodiment of the present invention, preferably, the connecting portion includes a first wiring section that connects at least one of the image sensor IC and the peripheral circuit component to the connector element, a second wiring section that is disposed at a position different from a position of the first wiring section in a thickness direction of the multilayer base body, and that connects at least one of the image sensor IC and the peripheral circuit component to the connector element, and a first ground conductor that is disposed between the first wiring section and the second wiring section, and that extends in opposing relation to the first wiring portion and the second wiring section.

With the features described above, since the first wiring section and the second wiring section are disposed at different positions in the thickness direction of the multilayer base body, the first wiring section and the second wiring section each is able to have a large wiring width. Furthermore, since the first ground conductor is disposed between the first wiring section and the second wiring section, a ground conductor to be arranged in opposing relation to the first wiring portion and a ground conductor to be arranged in opposing relation to the second wiring section are able to be formed as one common ground conductor. As a result, the number of layers of the ground conductors is reduced, and the thickness of the connecting portion is reduced.

In the camera module according to a preferred embodiment of the present invention, preferably, a transmission speed of a signal propagating through the first wiring section is different from a transmission speed of a signal propagating through the second wiring section.

With the feature described above, the spacing between each wiring section and the ground conductor is able to be set to be suitable for a signal propagating through the wiring section by separately forming two wiring sections at different positions in the thickness direction of the multilayer base body depending on respective transmission speeds of the signals propagating through the wiring sections. For example, by setting larger the spacing between the first wiring section in which the transmission speed of the signal is high and the first ground conductor, a signal loss is reduced. When plural wiring lines are adjacent to each other in the first wiring section, interference between the wiring lines is significantly reduced or prevented by setting smaller the spacing between the first wiring section and the first ground conductor.

In the camera module according to a preferred embodiment of the present invention, preferably, the transmission speed of the signal propagating through the first wiring section is faster than the transmission speed of the signal propagating through the second wiring section, and a length of a transmission path for the signal propagating through the first wiring section is shorter than a length of a transmission path for the signal propagating through the second wiring section.

With the features described above, since the length of the transmission path for the signal propagating through the first wiring section is set shorter, a loss of the relevant signal is reduced.

In the camera module according to a preferred embodiment of the present invention, preferably, at least one of the peripheral circuit components is arranged at a position except for a region between the cavity and the connecting portion when looking at the first mounting portion in a plan view. With that feature, a wiring density is significantly reduced in the region between the cavity and the connecting portion, and arrangement of the peripheral circuit components and the image sensor IC is facilitated.

An electronic device according to a preferred embodiment of the present invention, preferably, includes the above-described camera module, a mounting substrate that is connected to the camera module through the connector element, and a metal body that is disposed on the mounting substrate, and that is positioned close to the connecting portion, wherein a transmission speed of a signal propagating through the first wiring section is faster than a transmission speed of a signal propagating through the second wiring section, and the camera module includes a second ground conductor that is arranged at side closer to the metal body than the first wiring section and the first ground conductor, and that covers the first wiring portion.

When the connecting portion is arranged close to the metal body, such as an outer casing of a battery pack, impedance mismatching may occur due to a capacitance that is generated between the metal body and the wiring section. With the features described above, since the second ground conductor is disposed as mentioned above, impedance mismatching is prevented from occurring in the first wiring section due to the influence of the external metal body. Moreover, undesired radiation from the first wiring section to the outside of the connecting portion is also prevented.

An electronic device according to a preferred embodiment of the present invention, preferably, includes the above-described camera module, a mounting substrate that is connected to the camera module through the connector element, and a metal body that is disposed on the mounting substrate, and that is positioned close to the connecting portion, wherein a transmission speed of a signal propagating through the first wiring section is faster than a transmission speed of a signal propagating through the second wiring section, and the first wiring section is positioned farther away from the metal body than the second wiring section.

With the features described above, even when the connecting portion is arranged close to the metal body, such as an outer casing of a battery pack, impedance mismatching is prevented from occurring in the first wiring section due to the influence of the external metal body because the first wiring section through which the signal having the higher transmission speed propagates is arranged at a position spaced from the external metal body.

Thus, according to the preferred embodiments of the present invention, a thin camera module having high reliability is realized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
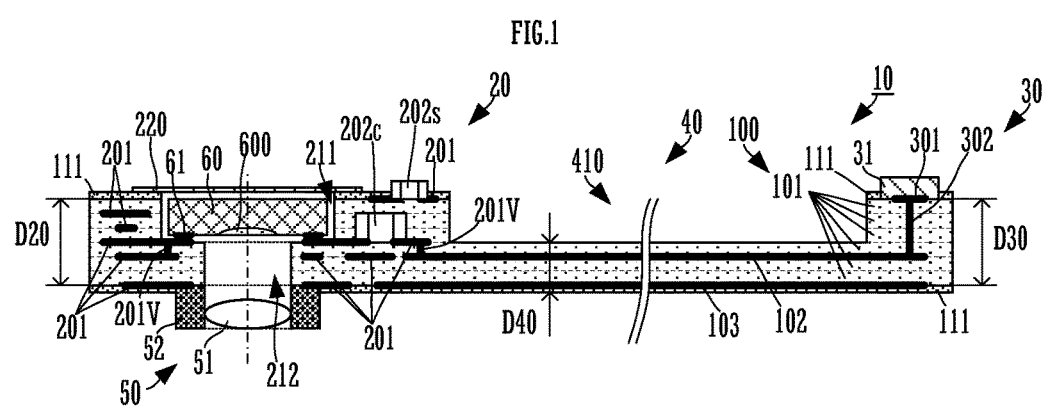
FIG. 1 is a side sectional view of a camera module according to a first preferred embodiment of the present invention.
Figure 2:
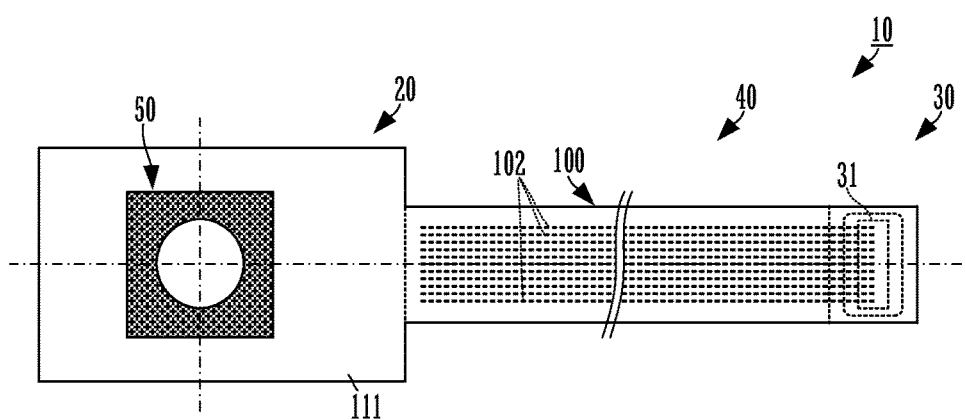
FIG. 2 is a plan view of the camera module according to the first preferred embodiment of the present invention when looking at the camera module from the lens surface side.
Figure 3:
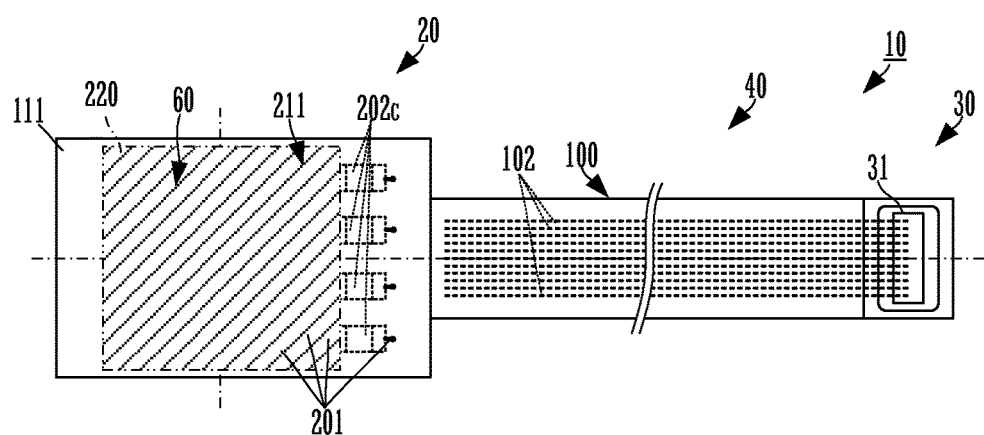
FIG. 3 is a plan view of the camera module according to the first preferred embodiment of the present invention when looking at the camera module from the image sensor side.
Figure 4:
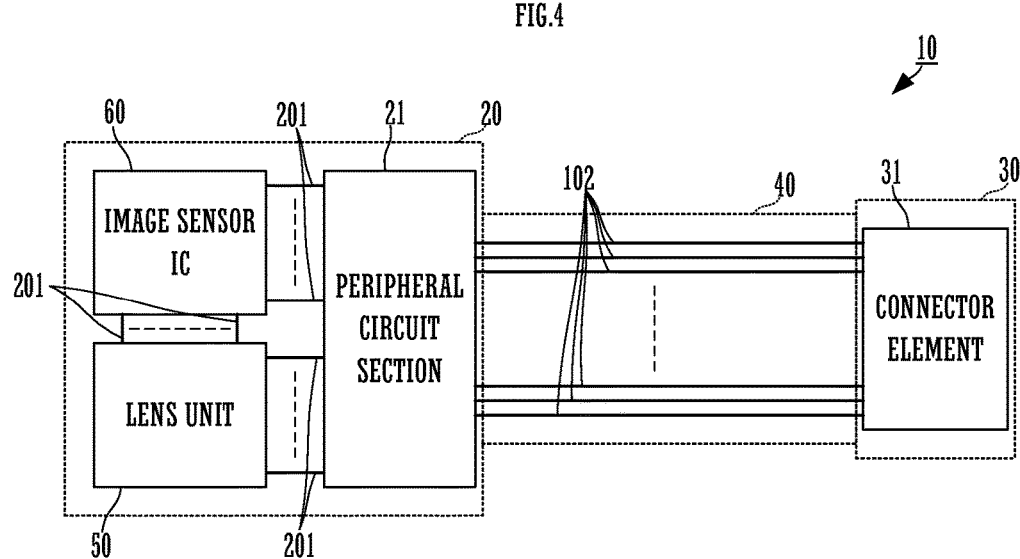
FIG. 4 is a functional block diagram of the camera module according to the first preferred embodiment of the present invention.

A camera module according to a first preferred embodiment of the present invention will be described below with reference to the drawings. FIG. 1 is a side sectional view of the camera module according to the first preferred embodiment of the present invention. FIG. 2 is a plan view of the camera module according to the first preferred embodiment of the present invention when looking at the camera module from the lens surface side. FIG. 3 is a plan view of the camera module according to the first preferred embodiment of the present invention when looking at the camera module from the image sensor side. FIG. 4 is a functional block diagram of the camera module according to the first preferred embodiment of the present invention. It is to be noted that FIGS. 1, 2 and 3 do not illustrate all of conductor patterns and peripheral circuit components, and they illustrate only elements and portions related to the features of various preferred embodiments of the present invention.

A camera module 10 includes a first mounting portion 20, a second mounting portion 30, and a connecting portion 40. From the viewpoint of a functional circuit diagram, as illustrated in FIG. 4, the camera module 10 includes a lens unit 50, an image sensor IC 60, a peripheral circuit section 21, and a connector element 31. The lens unit 50, the image sensor IC 60, and the peripheral circuit section 21 are disposed in the first mounting portion 20. Furthermore, conductor patterns 201 are arranged in the first mounting portion 20 to interconnect the lens unit 50, the image sensor IC 60, and the peripheral circuit section 21. The connector element 31 is disposed in the second mounting portion 30. The connecting portion 40 physically and electrically connects the first mounting portion 20 and the second mounting portion 30 to each other.

The camera module 10 includes a multilayer base body 100. The multilayer base body 100 is constituted by laminating a plurality of flexible base material layers 101. The conductor patterns 201 are formed in particular ones of the flexible base material layers 101. The flexible base material layers 101 are each preferably made of a thermoplastic resin, e.g., a liquid crystal polymer. Using the liquid crystal polymer is preferable in points of providing higher water resistance and suppressing size variations with higher reliability than in the case using other flexible base materials represented by polyimide.

Of the flexible base material layers 101, a predetermined number of the layers are formed in a shape extending over the entirety of the first mounting portion 20, the second mounting portion 30, and the connecting portion 40. Furthermore, the number of the flexible base material layers 101 laminated in the first mounting portion 20 and the number of the flexible base material layers 101 laminated in the second mounting portion 30 are larger than the number of the flexible base material layers 101 laminated in the connecting portion 40.

With the structure described above, the first mounting portion 20, the second mounting portion 30, and the connecting portion 40 are integrally defined by one multilayer base body 100. Furthermore, a thickness D20 of the first mounting portion and a thickness D30 of the second mounting portion 30 are larger than a thickness D40 of the connecting portion 40. By properly setting the number of the flexible base material layers 101 laminated in common and the respective numbers of the flexible base material layers 101 laminated in the first mounting portion 20 and the second mounting portion 30, the strength (rigidity) of the first mounting portion 20 and the second mounting portion 30 is increased while flexibility is ensured in the connecting portion 40. In addition, because of no necessity of mechanically connecting the above-mentioned portions by using solders, stress generated due to bending is distributed, and durability against bending and warping is increased. As a result, reliability in connection of the image sensor IC 60 and the lens unit 50 is also ensured.

In the structure of this preferred embodiment, the common flexible base material layers 101 are arranged at one side of the multilayer base body 100 in a direction of thickness thereof. Thus, a surface of the multilayer base body 100 at the one side in the thickness direction is a flat surface extending from the first mounting portion 20 to the second mounting portion 30 through the connecting portion 40. On the other hand, a surface of the multilayer base body 100 at the other side in the thickness direction has such a shape that the first mounting portion 20 and the second mounting portion 30 project from the connecting portion 40, i.e., such a structure that a recess 410 recessed in the thickness direction is located only in a region of the multilayer base body 100 corresponding to the connecting portion 40. A protective layer 111 having insulation is coated substantially over the entire surface of the multilayer base body 100 at the one side. The protective layer 111 is a layer made of a resist, for example. The protective layer 111 is further coated over regions of the surface of the multilayer base body 100 at the other side, the regions corresponding to the first mounting portion 20 and the second mounting portion 30.

The lens unit 50, the image sensor IC 60, and the peripheral circuit section 21 are mounted or provided in the first mounting portion 20 of the multilayer base body 100. The peripheral circuit section 21 includes peripheral circuit components 202$c$ and 202$s$ and conductor patterns 201 and 201$v$. In addition, the first mounting portion 20 of the multilayer base body 100 includes a cavity 211 and a penetration hole 212.

The cavity 211 is recessed by a predetermined depth from a surface of the first mounting portion 20 at the side where the first mounting portion 20 projects from the connecting portion 40 in the thickness direction. The depth of the cavity 211 is larger than the height of the image sensor IC 60. In other words, the depth of the cavity 211 is determined such that, when the image sensor IC 60 is mounted in the cavity 211, a top surface of the image sensor IC 60 does not project from the cavity 211.

An opening area of the cavity 211 is just required to be larger than a planar area of the image sensor IC 60. The opening area of the cavity 211 is preferably as close as to the planar area of the image sensor IC 60 from the viewpoint of increasing the protection ability and the light shielding ability for the image sensor IC 60.

The cavity 211 is preferably located about at a center of the first mounting portion 20 when looked at in a plan view. However, the cavity 211 is just required to be positioned such that the cavity 211 is completely surrounded by wall surfaces without being opened at any lateral surfaces of the first mounting portion 20.

Furthermore, an inner bottom surface of the cavity 211 is preferably positioned to be flush with a surface of the connecting portion 40 at the other side in the thickness direction. Stated in another way, a height (given by D20-D40) through which the first mounting portion 20 projects is preferably set equal or substantially equal to the depth of the cavity 211.

The penetration hole 212 preferably has a shape penetrating from the inner bottom surface of the cavity 211 to one end surface of the first mounting portion 20 of the multilayer base body 100 (i.e., to a surface of the first mounting portion 20, which surface is flat in continuation to the connecting portion 40 and the second mounting portion 30). The penetration hole 212 is configured such that a center of the penetration hole 212 is aligned or substantially aligned with a center of the cavity 211 when looked at in a plan view. An opening shape of the penetration hole 212 is set to have a larger size than the shape of a lens 51 of the lens unit 50 that is arranged on the one end surface of the first mounting portion 20. The penetration hole 212 defines and functions as an optical path that optically couples the lens 51 and the image sensor IC 60.

The lens unit 50 includes the lens 51 and a lens driving unit 52. The lens driving unit 52 is configured to not only hold the lens 51, but also to change a position of the lens in the height (thickness) direction. The lens unit 50 is arranged on the one end surface of the first mounting portion 20. More specifically, the lens unit 50 is arranged in the first mounting portion 20 such that an opening center of the penetration hole 212 is aligned with a planar center of the lens 51. The lens driving unit 52 is connected to the conductor patterns 201 provided in the multilayer base body 100.

The image sensor IC 60 is arranged in the cavity 211 in the other end surface of the first mounting portion 20. More specifically, the image sensor IC 60 is arranged with the light receiving element 600 directed toward the inner bottom surface of the cavity 211. External connection lands 61 of the image sensor IC 60 are mounted to mounting electrodes (i.e., the conductor patterns 201) provided on the inner bottom surface of the cavity 211. Thus, the image sensor IC 60 is connected to the conductor patterns 201 provided in the multilayer base body 100.

With the structure described above, since the image sensor IC 60 is located in the cavity 211, outside light other than light passing through the lens unit 50 and the penetration hole 212 is greatly suppressed by walls defining the cavity 211 from entering the light receiving surface of the image sensor IC 60. As a result, imaging performance is greatly improved.

Moreover, a cover member 220 is arranged at an opening of the cavity 211. The cover member 220 preferably includes a light-shielding material in the form of a flat plate, and it has a shape covering the entire opening of the cavity 211. With the provision of the cover member 220, undesired outside light is reliably prevented from entering the light receiving surface of the image sensor IC 60.

Furthermore, the cover member 220 is preferably made of a material having higher strength than the flexible base material layers 101. For example, a metal member is used as the cover member 220. By using such a material, it is possible to improve the shape maintaining function of the cavity 211, and to reinforce the strength of the first mounting portion 20.

The conductor patterns 201 are configured in predetermined patterns between the flexible base material layers 101, as well as on the one end surface and the other end surface of the first mounting portion 20 in order to realize the circuit function of the peripheral circuit section 21. The conductor patterns 201 are located in a region of the first mounting portion 20 other than the cavity 211 and the penetration hole 212, i.e., a region where the flexible base material layers 101 are present. The conductor patterns 201v are the so-called via conductors and each extend in a direction penetrating through corresponding one of the flexible base material layers 101. By thus providing the conductor patterns 201 and 201v in the region where the flexible base material layers 101 are present, the strength of the region where the flexible base material layers 101 are present, i.e., the strength of the first mounting portion 20, is increased. A density at which the conductor patterns 201 and 201v are provided in the first mounting portion is preferably set to be higher than that in the connecting portion 40.

The peripheral circuit components 202c and 202s are mountable components and are, e.g., passive element components such as bypass capacitors. The peripheral circuit components 202c and 202s are connected to the lens unit 50 and the image sensor IC 60 through the conductor patterns 201.

The peripheral circuit component 202c is mounted inside the first mounting portion 20 of the multilayer base body 100. More specifically, the peripheral circuit component 202c is incorporated in a portion of the first mounting portion 20 of the multilayer base body 100, the portion defining a sidewall of the cavity 211. Here, when the peripheral circuit component 202c is, e.g., a ceramic capacitor or the like and has higher strength than the flexible base material layers 101, the strength (rigidness) of the sidewall of the cavity 211 is increased and hence the strength (rigidness) of the first mounting portion 20 is further increased by incorporating that type of peripheral circuit component 202c as described above.

Furthermore, the peripheral circuit component 202c is arranged in the first mounting portion 20 between the cavity 211 and an end surface at the side adjacent to the connecting portion 40. With such an arrangement, the strength of a connecting region between the first mounting portion 20 and the connecting portion 40 is increased. Accordingly, even when stress is applied to the boundary between the first mounting portion 20 and the connecting portion 40 upon bending or warping of the connecting portion 40, it is possible to greatly reduce or prevent the occurrence of breakage in the above-mentioned connecting region and application of the stress to the image sensor IC 60.

Moreover, the peripheral circuit component 202c is mounted in the first mounting portion 20 in its region near a boundary surface between the flexible base material layers, which are in common to both the first mounting portion 20 and the connecting portion 40, and the flexible base material layers, which are not in common to both the first mounting portion 20 and the connecting portion 40 (i.e., the flexible base material layers at the side projecting relative to the connecting portion in FIG. 1) when viewed in the thickness direction. More specifically, the peripheral circuit component 202c is disposed in a region of the first mounting portion 20 spanning from the boundary surface into the flexible base material layers of the first mounting portion 20, which layers are not shared by the connecting portion 40. Stress generated upon the bending or the warping tends to be applied to the above-mentioned region. By arranging the peripheral circuit component 202c having high strength in that region, however, the durability against the stress generated upon the bending or the warping is further increased. In addition, since a cavity in which the peripheral circuit component 202c is arranged (i.e., a recess for the peripheral circuit component) is able to be formed in the same step as that for forming the cavity 211 in which the image sensor IC 60 is arranged, manufacturing of the camera module is facilitated.

Preferably, as illustrated in FIG. 3, plural peripheral circuit components 202c are arranged between the cavity 211 and an end surface of the first mounting portion 20 at the side adjacent to the connecting portion 40. Also, preferably, plural peripheral circuit components 202c are arranged near the boundary surface between the flexible base material layers, which are in common to both the first mounting portion 20 and the connecting portion 40, and the flexible base material layers, which constitute only the first mounting portion 20, when viewed in the thickness direction. Such an arrangement contributes to further increasing the strength and to further improving the durability against the stress generated upon the bending or the warping.

With the structure described above, since the lens unit 50 is arranged on the one end surface of the first mounting portion 20 and the image sensor IC 60 is arranged in the cavity 211 at the other end surface side of the first mounting portion 20, the thickness of the first mounting portion 20, i.e., the thickness of an imaging function portion, is able to be made as thin as possible while the spacing between the lens unit 50 and the image sensor IC 60 is held at a necessary distance.

Furthermore, the peripheral circuit section 21 including the peripheral circuit components 202c and 202s and the conductor patterns 201 is arranged in the region of the first mounting portion 20 where the flexible base material layers 101 are present, except for the cavity 211 in which the image sensor IC 60 is arranged and the penetration hole 212. In particular, the peripheral circuit components, etc. are arranged at a higher density in the sidewall of the cavity 211. Thus, since the peripheral circuit section 21 is not arranged side by side relative to the lens unit 50 and the image sensor IC 60 in the thickness direction, the thickness of the imaging function portion is reduced, and the cavity 211 is made less susceptible to deformation.

A signal conductor 102 and a ground conductor 103 are provided in the connecting portion 40. The signal conductor 102 extends in an elongated configuration and is disposed in plural. The signal conductor 102 and the ground conductor 103 are arranged to extend in a direction in which the connecting portion 40 extends, i.e., parallel or substantially parallel to a direction in which the first mounting portion 20 and the second mounting portion 30 are connected to each other. As illustrated in FIGS. 2 and 3, the plural signal conductors 102 are arrayed at predetermined intervals in a widthwise direction of the connecting portion 40 (i.e., in a direction perpendicular to both the extending direction and the thickness direction thereof).

One end of the signal conductor 102 in the extending direction is connected to the conductor pattern 201 in the first mounting portion 20. The other end of the signal conductor 102 in the extending direction is connected to a connection via conductor 302 in the second mounting portion 30.

The signal conductor 102 is arranged at a position midway in the thickness direction of the connecting portion 40. The ground conductor 103 is arranged in a surface of the connecting portion 40 at one side. With such an arrangement, a microstrip transmission line is defined by the signal conductor 102, the ground conductor 103, and the flexible base material layers 101 positioned between them. As a result, a high-frequency transmission line with high flexibility is realized. Thus, flexibility of the connecting portion 40 is ensured. In addition, other lines including a low-frequency or DC line, such as a power source line, are also disposed. The low-frequency or DC line, such as the power source line, is not necessarily required to constitute the so-called 50-Ω line represented by the microstrip transmission line.

In the second mounting portion 30, a connector mounting land 301 and the connection via conductor 302 are provided in the multilayer base body 100. More specifically, the connector mounting land 301 is located on the other end surface of the second mounting portion 30 (i.e., its end surface at the side projecting relative to the connecting portion 40). The connector mounting land 301 and the signal conductor 102 are connected to each other by the connection via conductor 302 extending in the thickness direction. The connector element 31 is mounted to the connector mounting land 301.

The thickness D30 of the second mounting portion 30 may be, for example, equal to the thickness D40 of the connecting portion 40. However, the strength of the second mounting portion 30 is able to be increased by setting the thickness D30 to be larger similarly to the first mounting portion 20. As a result, the second mounting portion 30 is prevented from being bent or warped when the connector element 31 is mounted to a mother board. Accordingly, the mounting of the connector element 31 is facilitated, and the boundary region between the second mounting portion 30 and the connecting portion 40 is prevented from being broken.

Thus, the camera module having a relatively low height and being endurable against bending, warping, etc., is realized by using the above-described structure of this preferred embodiment.

The camera module 10 having the above-described structure is able to be manufactured through the following non-limiting example of a manufacturing process.

First, thermoplastic flexible sheets each made of a liquid crystal polymer, for example, are prepared. The flexible sheet may be coated with a metal on one side or both sides. A metal film used in such a metal-coated sheet is typically a copper foil. The conductor patterns 201, the signal conductors 102, the ground conductor 103, etc. are formed on a predetermined one or more of the flexible sheets by carrying out a patterning process on the flexible sheets with the photolithography and etching technique. Moreover, after forming bores for via conductors, which become the conductor pattern 201v, the connection via conductor 302 and so on, in the flexible sheets, a conductive paste containing tin or silver as a main component is filled into the bores.

Next, openings becoming the cavity 211, the penetration hole 212, and the recess 410 later are formed in the flexible sheets, which have been subjected to the patterning, by die-cutting.

The flexible sheets having been subjected to the patterning process and the step of forming the openings are stacked one above another. In this connection, cavities (recesses for the peripheral circuit components) are previously formed by die-cutting in the flexible sheets depending on the positions where the peripheral circuit components 202c to be incorporated in the camera module are arranged. The peripheral circuit components 202c to be incorporated in the camera module are then placed and held in the stacked flexible sheets such that they are accommodated in the corresponding cavities (recesses for the peripheral circuit components).

In the above-mentioned state, the plural stacked flexible sheets are thermally pressure-bonded. At that time, because of using the thermoplastic resin, the flexible sheets can be integrated together to form the multilayer base body 100 without any adhesive layer, such as a bonding sheet or prepreg. Furthermore, during the thermal pressure-bonding, the conductive paste filled into the bores for the via conductors are metallized (sintered), such that the via conductors (interlayer connecting conductors) are formed.

The above-mentioned steps preferably are carried out in a multi-sheet state where plural multilayer base bodies 100 are regularly arrayed.

Next, components to be mounted, i.e., the lens unit 50, the image sensor IC 60, and the peripheral circuit components 202s are mounted to each of the multilayer base bodies 100 in the multi-sheet state. The lens unit 50, the image sensor IC 60, and the peripheral circuit components 202s are mounted by connecting them with the aid of solders, metal bumps, etc.

The camera module 10 is then obtained by cutting the multi-sheet in units of the multilayer base body 100.

Figure 5:
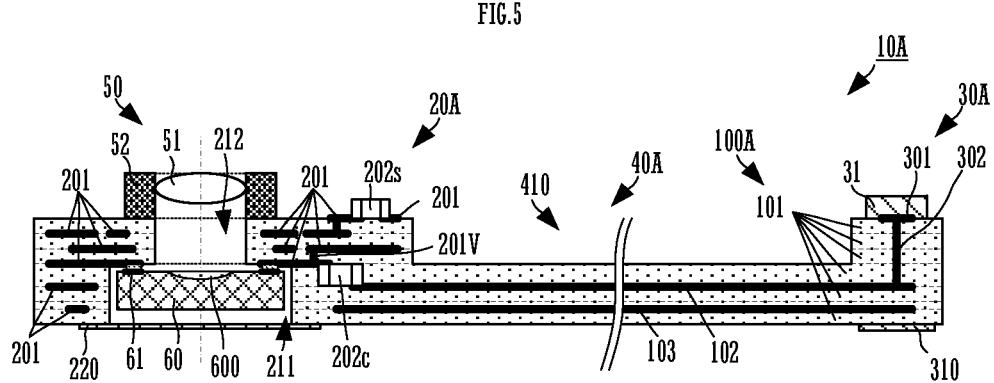
FIG. 5 is a side sectional view of a camera module according to a second preferred embodiment of the present invention.
Figure 6:
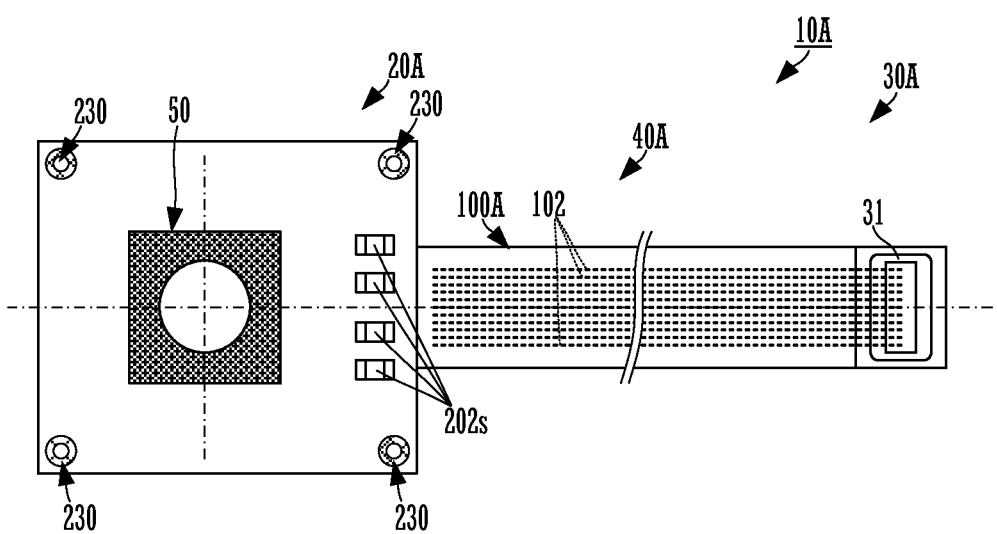
FIG. 6 is a plan view of the camera module according to the second preferred embodiment of the present invention when looking at the camera module from the lens surface side.

A camera module according to a second preferred embodiment of the present invention will be described below with reference to the drawings. FIG. 5 is a side sectional view of a camera module according to a second preferred embodiment of the present invention. FIG. 6 is a plan view of the camera module according to the second preferred embodiment of the present invention when looking at the camera module from the lens surface side.

In a basic structure of a camera module 10A according to the second preferred embodiment, a positional relationship between the lens unit 50 and the image sensor IC 60 in a first mounting portion 20A is reversed in the thickness direction in comparison with that in the first preferred embodiment. Stated in another way, the lens unit 50 and the connector element 31 are arranged at the same side of a multilayer base body 100A. The other basic structure of the camera module 10A is preferably the same or substantially the same as that of the camera module according to the first preferred embodiment. Hence only different points from the camera module 10 according to the first preferred embodiment will be described in detail below.

The cavity 211 is recessed from one end surface of the first mounting portion 20A (i.e., from a surface of the first mounting portion 20A, which surface is flat in continuation to a connecting portion 40A and a second mounting portion 30A). The penetration hole 212 extends from an inner bottom surface of the cavity 211 to the other end surface of the first mounting portion 20A (i.e., to an end surface thereof at the side projecting from the connecting portion 40A).

The image sensor IC 60 is arranged in the cavity 211, and the lens unit 50 is arranged on the other end surface of the first mounting portion 20A.

Furthermore, a reinforcing plate 310 is arranged in the second mounting portion 30A of the camera module 10A according to this preferred embodiment. The reinforcing plate 310 is attached to one end surface of the second mounting portion 30A, namely to an end surface of the second mounting portion 30A at the side opposite to its end surface to which the connector element 31 is mounted. The reinforcing plate 310 is preferably a plate having high strength, such as a metal plate made of stainless steel, for example. With the provision of the reinforcing plate 310, the strength (rigidness) of the second mounting portion 30A is increased, and the strength required for connection of a connector is ensured.

The camera module having a relatively low height and being endurable against bending, warping, etc., is also realized, as in the first preferred embodiment, with the structure described above.

Moreover, in the camera module 10A according to this preferred embodiment, the peripheral circuit component 202c is mounted in a region of the first mounting portion 20A spanning, from a boundary surface between the flexible base material layers, which are in common to both the first mounting portion 20A and the connecting portion 40A, and the flexible base material layers, which are not in common to both the first mounting portion 20A and the connecting portion 40A, toward the side including the common flexible base material layers in the thickness direction. With such an arrangement, the camera module having a relatively low height and being endurable against bending, warping, etc., is also realized. In addition, manufacturing of the camera module is facilitated because a cavity in which the peripheral circuit component 202c is arranged (i.e., a recess for the peripheral circuit component) is preferably formed in the same step as that for forming the cavity 211 in which the image sensor IC 60 is arranged.

Furthermore, in the camera module 10A according to this preferred embodiment, fixing holes 230 are preferably located near corners of the first mounting portion 20A when looked at in a plan view. Each of the fixing holes 230 penetrates through the first mounting portion 20A in the thickness direction. With the presence of the fixing holes 230, the first mounting portion 20A is easily fixed to a mother board or a casing of a portable device or an electronic device by screwing, for example.

By covering the fixing hole 230 with a metal film, for example, the strength of the first mounting portion 20A is increased while the strength of the fixing hole 230 is increased.

In the camera module 10A according to this preferred embodiment, the peripheral circuit components 202s are arranged in the first mounting portion 20A to be concentrated in a region that is positioned near an end surface of the first mounting portion 20A, the end surface being connected to the connecting portion 40A, and that is connected to the connecting portion 40A when looked at in a plan view. As a result, the strength of a connecting region between the first mounting portion 20A and the connecting portion 40A is further increased.

While the camera module 10A according to the second preferred embodiment preferably does not include the protective layer that is included in the camera module 10 according to the first preferred embodiment, the protective layer may be arranged, as required, in the second preferred embodiment. In other words, the protective layer can be omitted in the case where the ground conductor 103 is not exposed to the surface of the multilayer base body 100 as in the connecting portion 40A of the camera module 10A.

Figure 7:
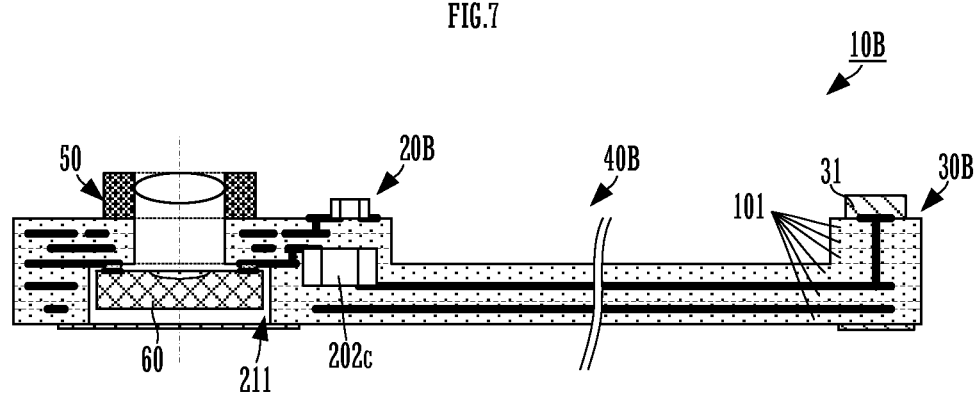
FIG. 7 is a side sectional view of a camera module according to a third preferred embodiment of the present invention.

A camera module according to a third preferred embodiment of the present invention will be described below with reference to the drawing. FIG. 7 is a side sectional view of the camera module according to the third preferred embodiment of the present invention.

A camera module 10B according to the third preferred embodiment is different from the camera module 10A according to the second preferred embodiment in position of the peripheral circuit component 202c, and the other basic structure of the camera module 10B is the same as that of the camera module 10A according to the second preferred embodiment. Hence only different points from the camera module 10A according to the second preferred embodiment will be described in detail below.

In the camera module 10B according to this preferred embodiment, the peripheral circuit component 202c is arranged in a first mounting portion 20B at a position between the cavity 211 and an end surface of the first mounting portion 20B at the side adjacent to a connecting portion 40B. Furthermore, the peripheral circuit component 202c is positioned in a state straddling, in the thickness direction of the first mounting portion 20B, a boundary surface between the flexible base material layers 101, which are in common to both the first mounting portion 20B and the connecting portion 40B, and the flexible base material layers 101, which are not in common to both the first mounting portion 20B and the connecting portion 40B, such that the peripheral circuit component 202c is incorporated in the flexible base material layers positioned adjacent to the boundary surface at both the sides of the peripheral circuit component 202c. The peripheral circuit component 202c has higher elasticity than the flexible base material layers 101. As a result, the camera module 10B is constituted to be endurable against bending, warping, etc., while it has a relatively low height.

Moreover, with the arrangement described above, even when excessive stress is transmitted from the connecting portion 40B to the flexible base material layers in the first mounting portion 20B, which are in common to both the first mounting portion 20B and the connecting portion 40B, and layer peeling progresses in the boundary surface between those common flexible base material layers and the flexible base material layers that are not in common to both the first mounting portion 20B and the connecting portion 40B, progressive peeling of the layer is prevented by the presence of the peripheral circuit component 202c. The occurrence of the layer peeling itself is significantly reduced or prevented. It is hence possible to prevent outside light from entering a space between the image sensor IC 60 and the lens unit 50 through a layer peeled portion, and to prevent degradation of an image obtained with the image sensor IC 60, such as the occurrence of a ghost.

While the camera module 10B described in the third preferred embodiment preferably has a similar structure to that of the camera module 10A described in the second preferred embodiment, the camera module 10B may have a similar structure to that of the camera module 10 described in the first preferred embodiment. Stated in another way, in the camera module 10 described in the first preferred embodiment, the peripheral circuit component 202c may be disposed in the first mounting portion 20 in the state straddling the boundary surface between the flexible base material layers, which are in common to both the first mounting portion and the connecting portion, and the flexible base material layers, which are not in common to both the first mounting portion and the connecting portion.

Figure 8:
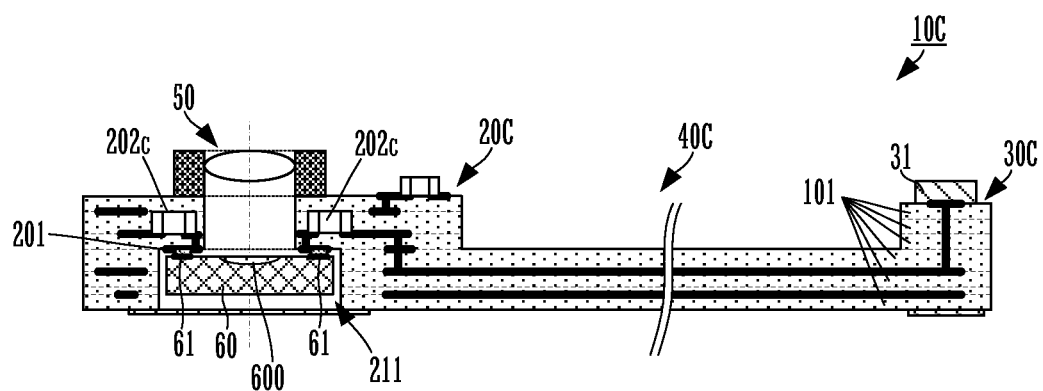
FIG. 8 is a side sectional view of a camera module according to a fourth preferred embodiment of the present invention.

A camera module according to a fourth preferred embodiment of the present invention will be described below with reference to the drawing. FIG. 8 is a side sectional view of the camera module according to the fourth preferred embodiment of the present invention.

A camera module 10C according to the fourth preferred embodiment is different from the camera modules 10A and 10B according to the second and third preferred embodiments in a position of the peripheral circuit component 202c, and the other basic structure of the camera module 10C is the same as that of the camera modules 10A and 10B according to the second and third preferred embodiments. Hence only different points from the camera modules 10A and 10B according to the second and third preferred embodiments will be described in detail below.

In the camera module 10C according to this preferred embodiment, the peripheral circuit component 202c is incorporated in the first mounting portion 20C in a portion defining a bottom wall of the cavity 211, and is disposed at a position opposing to the external connection land 61 of the image sensor IC 60 and a mounting electrode (i.e., the conductor pattern 201) to mount the image sensor IC 60. The peripheral circuit component 202c has higher elasticity than the flexible base material layers 101. As a result, the camera module 10C is also resistant to damage due to bending, warping, etc., while it has a relatively low height.

Moreover, with the arrangement described above, since the peripheral circuit component 202c is incorporated in the first mounting portion 20C to face the external connection land of the image sensor IC 60, rigidity and heat resistance of the bottom wall of the cavity 211 are increased, and the bottom wall of the cavity 211 is prevented from being deformed due to pressure and heat that are generated when mounting the image sensor IC 60. Thus, in the mounted state of the image sensor IC 60, parallelism of the light receiving element 600 of the image sensor IC 60 is kept high relative to the inner bottom surface of the cavity 211, and optical characteristics of the camera module 10C is improved.

While the camera module 10C described in the fourth preferred embodiment has a similar structure to that of the camera modules 10A and 10B described respectively in the second and third preferred embodiments, the camera module 10C may have a similar structure to that of the camera module 10 described in the first preferred embodiment. Stated in another way, in the camera module 10 described in the first preferred embodiment, the peripheral circuit component 202c may be disposed at a position opposing to the image sensor IC.

Furthermore, all the peripheral circuit components 202c are not always required to be disposed only at positions opposing to the image sensor IC, and some of the peripheral circuit components 202c may be disposed at positions inside the sidewall of the cavity, as in the first to third preferred embodiments, other than the positions opposing to the image sensor IC.

Figure 9A:
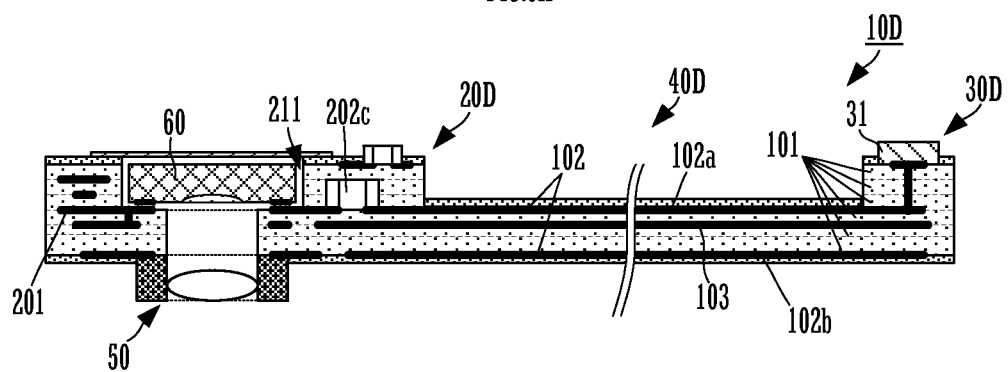
FIGS. 9A and 9B are each a side sectional view of a camera module according to a fifth preferred embodiment of the present invention.
Figure 9B:
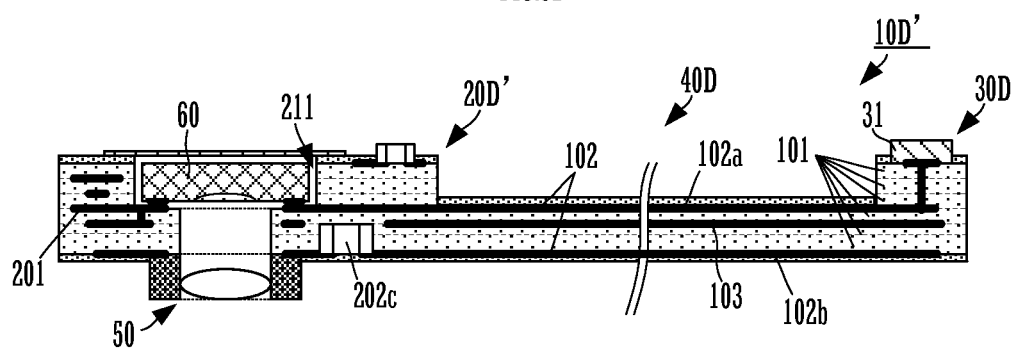

A camera module according to a fifth preferred embodiment of the present invention will be described below with reference to the drawings. FIGS. 9A and 9B are each a side sectional view of the camera module according to the fifth preferred embodiment of the present invention. It is to be noted that connection layout of the peripheral circuit component with respect to the image sensor IC and the lens unit is different between FIGS. 9A and 9B.

As illustrated in FIG. 9A, a camera module 10D according to the fifth preferred embodiment is different from the camera modules 10 according to the first preferred embodiment in a wiring structure, and the other basic structure of the camera module 10D is preferably the same or substantially the same as that of the camera module 10 according to the first preferred embodiment. Hence only different points from the camera module 10 according to the first preferred embodiments will be described in detail below.

A first wiring section 102a, a second wiring section 102b, and a ground conductor (first ground conductor) 103 are provided in a connecting portion 40D of the camera module 10D. The first wiring section 102a and the second wiring section 102b each include plural signal conductors 102 that are arrayed side by side in a widthwise direction of the connecting portion 40D. The signal conductors 102 extend in an extending direction of the connecting portion 40D, i.e., in a direction in which the first mounting portion 20D and a second mounting portion 30D are connected to each other.

The first wiring section 102a is disposed in the connecting portion 40D at a certain position in the thickness direction near one surface thereof (i.e., a surface of the connecting portion 40D at the side where the first mounting portion 20D and the second mounting portion 30D project from the connecting portion 40D; in the illustrated example, a surface thereof at the side closer to the image sensor IC 60 and farther away from the lens unit 50). The second wiring section 102b is disposed in the connecting portion 40D at a certain position in the thickness direction near the other surface thereof (i.e., a surface of the connecting portion 40D at the side where the connecting portion 40D, the first mounting portion 20D, and the second mounting portion 30D are flush with one another; in the illustrated example, a surface thereof at the side closer to the lens unit 50 and farther away from the image sensor IC 60). The ground conductor 103 is disposed in the connecting portion 40D at a certain position in the thickness direction between the first wiring section 102a and the second wiring section 102b, and it extends in opposing relation to each of the first wiring section 102a and the second wiring section 102b. A protective film (resist film) is preferably provided, as appropriate, on each of surfaces of the connecting portion 40D such that the first wiring section 102a and the second wiring section 102b are not exposed to the outside from the surfaces of the connecting portion 40D.

The signal conductors 102 of the first wiring section 102a extend in a state opposing to the ground conductor 103. One end of each of those signal conductors 102 is connected to the image sensor IC 60 through the peripheral circuit component 202c in the first mounting portion 20D, and the other end thereof is connected to the connector element 31 in the second mounting portion 30D. Furthermore, each of the signal conductors 102 of the first wiring section 102a forms, together with the ground conductor 103 and the flexible base material layer 101, a microstrip transmission line (50-Ω line)

through which a signal (high-frequency signal) having a high transmission speed, such as an image signal, propagates.

One end of each of the signal conductors 102 of the second wiring section 102b is connected to the image sensor IC 60 or the lens unit 50 in the first mounting portion 20D, and the other end thereof is connected to the connector element 31 in the second mounting portion 30D. Furthermore, each of the signal conductors 102 of the second wiring section 102b defines, together with the ground conductor 103 and the flexible base material layer 101, a line through which a signal (low-frequency signal) having a low transmission speed propagates, such as a control line. Alternatively, each of the signal conductors 102 constituting the second wiring section 102b may define a line through which a signal (DC signal) having a low transmission speed propagates, such as a power supply line.

Thus, since the first wiring section 102a and the second wiring section 102b are disposed in the multilayer base body 100 at different positions in the thickness direction, the first wiring section 102a and the second wiring section 102b are each able to be disposed in a wider wiring width, and a degree of freedom in design of the first wiring section 102a and the second wiring section 102b is increased. Furthermore, since the ground conductor 103 is disposed between the first wiring section 102a and the second wiring section 102b, a ground conductor to be provided in opposing relation to the first wiring section 102a and a ground conductor to be provided in opposing relation to the second wiring section 102b is able to be configured in common as one ground conductor 103, and the connecting portion 40D has a smaller thickness.

Moreover, the signal conductors 102 through which signals having high transmission speeds flow are collected in the first wiring section 102a, and the signal conductors 102 through which signals having low transmission speeds flow are collected in the second wiring section 102b in a state that those two groups of the signal conductors 102 are separated by the ground conductor 103. Therefore, the spacing between the first wiring section 102a and the ground conductor 103 and the spacing between the second wiring section 102b and the ground conductor 103 are each set to a constant and proper value. For example, by setting smaller the spacing from each of the signal conductors 102 to the ground conductor 103 in the first wiring section 102a and the second wiring section 102b, signal interference between adjacent two of the signal conductors 102 is significantly reduced or prevented. Furthermore, by setting larger the spacing from each of the signal conductors 102 to the ground conductor 103 in the first wiring section 102a and the second wiring section 102b, a capacitance generated between the signal conductor 102 and the ground conductor 103 is significantly reduced, and a signal loss is significantly reduced or prevented.

In this preferred embodiment, the first wiring section 102a through which the signal having the high transmission speed propagates is disposed at a certain position in the thickness direction closer to the mounting electrode for mounting of the image sensor IC 60 than the second wiring section 102b through which the signal having the low transmission speed propagates, such that the length of a transmission path through which the signal having the high transmission speed is shortened. Accordingly, it is possible to reduce the loss of a signal, such as a high-frequency signal, which tends to undergo a larger signal loss with an increase of the transmission path length.

While the camera module 10D described in the fifth preferred embodiment represents an example using a similar structure to that of the camera module 10 described in the first preferred embodiment, the camera module 10D may have a similar structure to that of the camera modules 10A, 10B and 10C described respectively in the second, third and fourth preferred embodiments. Stated in another way, in the camera modules 10A, 10B and 10C, a wiring section through which a signal having a high transmission speed propagates and a wiring section through which a signal having a low transmission speed propagates may be disposed in a separated state with the ground conductor interposed between both the wiring sections.

In the camera module 10D illustrated in FIG. 9A, the peripheral circuit component 202c is connected in series to the first wiring section 102a that interconnects the image sensor IC and the connector element 31. In a camera module 10D' illustrated in FIG. 9B, however, the peripheral circuit component 202c is connected in series to the second wiring section 102b instead of being connected in series to the first wiring section 102a. More specifically, in FIG. 9B, the peripheral circuit component 202c is connected in series to an intermediate point of the second wiring section 102b in a first mounting portion 20D'.

Stated in another way, in the camera module 10D' illustrated in FIG. 9B, the image sensor IC 60 and the connector element 31 are directly connected to each other by the wiring section through which the signal having the high transmission speed propagates, without interposition of any other circuit members.

With the arrangement described above, a wiring path through which the signal having the high transmission speed propagates does not include a portion where the dielectric constant is different from that of the other portion due to the presence of any circuit member different from the wiring section. As a result, reflection of the signal at the interface between two portions having different dielectric constants is significantly reduced, and variations in a transmission delay time are significantly reduced or prevented. Thus, even a signal that is required to have a high transmission speed is transmitted with a lower loss.

Figure 10:
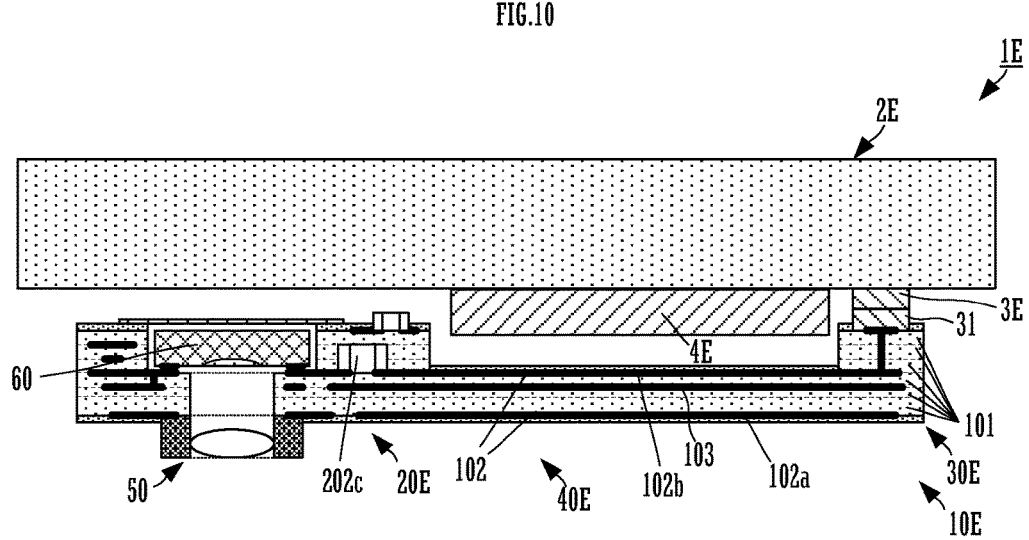
FIG. 10 is a side sectional view of an electronic device according to a sixth preferred embodiment of the present invention.

A camera module and an electronic device according to a sixth preferred embodiment of the present invention will be described below with reference to the drawings. FIG. 10 is a side sectional view of the electronic device according to the sixth preferred embodiment of the present invention.

An electronic device 1E of this preferred embodiment includes a mounting substrate 2E and a camera module 10E. A connector element 3E and a metal body 4E are disposed on one surface of the mounting substrate 2E. The connector element 31 of the camera module 10E preferably is mounted to the connector element 3E. The camera module 10E is mounted to the connector element 3E of the mounting substrate 2E through the connector element 31, and one surface of a connecting portion 40E at the side where a first mounting portion 20E and a second mounting portion 30E project is positioned to face the mounting substrate 2E. The metal body 4E constitutes an outer casing of a battery pack here, and it is mounted to the mounting substrate 2E at a position opposing to the connecting portion 40E of the camera module 10E.

The camera module 10E of the sixth preferred embodiment is different from the camera module 10D described in the fifth preferred embodiment in that the position of the first wiring section 102a through which the signal having the high transmission speed propagates and the second wiring section 102b through which the signal having the low transmission speed propagates are exchanged. The other basic structure is preferably the same or substantially the same as that of the camera module 10D described in the fifth preferred embodiment.

In more detail, the second wiring section 102b through which the signal having the low transmission speed propagates is disposed in the connecting portion 40E at a certain position in the thickness direction near one surface thereof (i.e., a surface of the connecting portion 40E at the side facing the metal body 4E). The first wiring section 102a through which the signal having the high transmission speed propagates is disposed in the connecting portion 40E at a certain position in the thickness direction near the other surface thereof (i.e., a surface of the connecting portion 40E at the side facing away from the metal body 4E). The ground conductor 103 is disposed in the connecting portion 40E at a certain position in the thickness direction between the first wiring section 102a and the second wiring section 102b, and it extends in opposing relation to each of the first wiring section 102a and the second wiring section 102b.

In that case, the length of a transmission path defined by the first wiring section 102a through which the signal (high-frequency signal) having the high transmission speed propagates is longer than that in the fifth preferred embodiment, but the first wiring section 102a is positioned farther away from the metal body 4E. If the spacing between the first wiring section 102a and the metal body 4E is short, a large capacitance would be generated between them, and impedance mismatching with respect to the high-frequency signal would be more likely to occur in the first wiring section 102a. Taking into account such a problem, in this preferred embodiment, the first wiring section 102a through which the signal (high-frequency signal) having the high transmission speed propagates is disposed farther away from the metal body 4E to significantly reduce or prevent the occurrence of impedance mismatching with respect to the high-frequency signal in the first wiring section 102a.

While the camera module 10E described in the sixth preferred embodiment preferably has a similar structure to that of the camera modules 10 and 10D described respectively in the first and fifth preferred embodiments, the camera module 10E may have a similar structure to that of the camera modules 10A, 10B and 10C described respectively in the second, third and fourth preferred embodiments.

Figure 11:
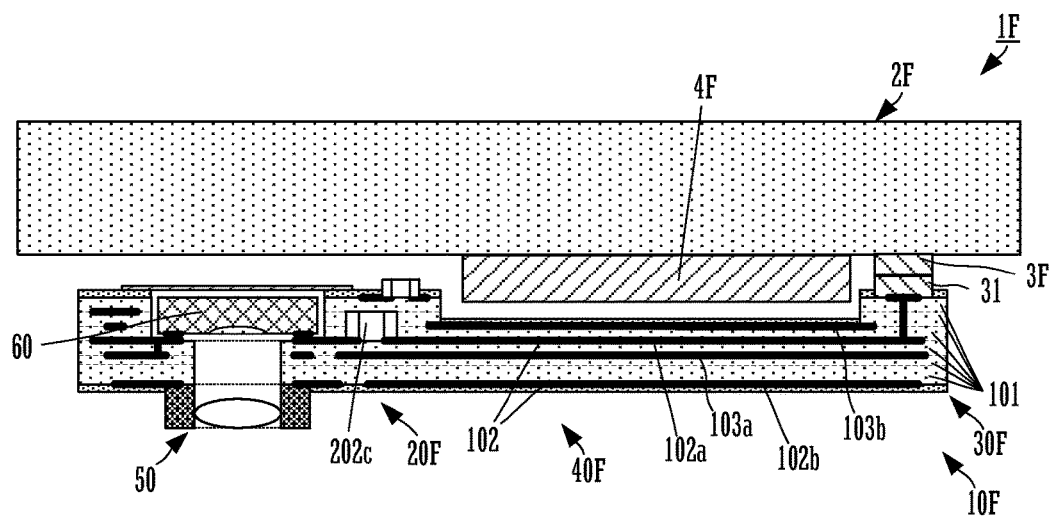
FIG. 11 is a side sectional view of an electronic device according to a seventh preferred embodiment of the present invention.

A camera module and an electronic device according to a seventh preferred embodiment of the present invention will be described below with reference to the drawings. FIG. 11 is a side sectional view of the electronic device according to the seventh preferred embodiment of the present invention.

An electronic device 1F and a camera module 10F of the seventh preferred embodiment are different from the electronic device 1E and the camera module 10E described in the sixth preferred embodiment in that an additional ground conductor (second ground conductor) 103b is disposed in a connecting portion 40F of the camera module 10F, and that the positions of the first wiring section 102a and the second wiring section 102b are exchanged. The other basic structure is preferably the same as that of the electronic device 1E and the camera module 10E described in the sixth preferred embodiment.

In more detail, the first wiring section 102a through which the signal having the high transmission speed propagates is disposed in the connecting portion 40F at a certain position in the thickness direction near one surface thereof (i.e., a surface of the connecting portion 40E at the side facing a metal body 4F). The second wiring section 102b through which the signal having the low transmission speed propagates is disposed in the connecting portion 40F at a certain position in the thickness direction near the other surface thereof (i.e., a surface of the connecting portion 40E at the side facing away from the metal body 4F). A first ground conductor 103a is disposed in the connecting portion 40F at a certain position in the thickness direction between the first wiring section 102a and the second wiring section 102b, and it extends in opposing relation to each of the first wiring section 102a and the second wiring section 102b. Furthermore, the connecting portion 40F includes one flexible base material layer 101 that is added to the one surface of the connecting portion 40F at the side facing the metal body 4F. The second ground conductor 103b is disposed on one surface of the added flexible base material layer 101, i.e., on a surface thereof at the side facing the metal body 4F, to cover the first wiring section 102a.

In that case, the length of a transmission path defined by the first wiring section 102a through which the signal (high-frequency signal) having the high transmission speed propagates is shorter than that in the above-described sixth preferred embodiment, and a signal loss in the first wiring section 102a is maintained smaller than that in the above-described sixth preferred embodiment. Furthermore, since the first wiring section 102a and the metal body 4F are isolated from each other by the second ground conductor 103b interposed between them, impedance mismatching with respect to the high-frequency signal is less likely to occur in the first wiring section 102a.

While the camera module 10F described in the seventh preferred embodiment has a similar structure to that of the camera modules 10, 10D and 10E described respectively in the first, fifth and sixth preferred embodiments, the camera module 10F may have a similar structure to that of the camera modules 10A, 10B and 10C described respectively in the second, third and fourth preferred embodiments.

While the camera module 10F described in the seventh preferred embodiment preferably has a structure that the ground conductor is disposed in only one of both the surfaces of the connecting portion 40F, it may have a structure that the ground conductor is disposed in each of both the surfaces of the connecting portion 40F.

Figure 12:
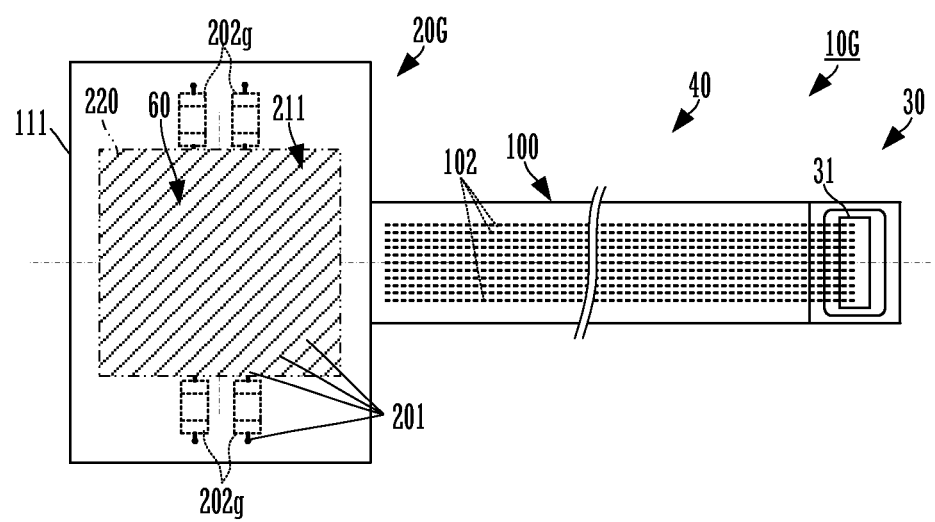
FIG. 12 is a plan view of a camera module according to an eighth preferred embodiment of the present invention when looking at the camera module from the image sensor side.

A camera module according to an eighth preferred embodiment of the present invention will be described below with reference to the drawing. FIG. 12 is a plan view of the camera module according to the eighth preferred embodiment of the present invention when looking at the camera module from the image sensor side.

A camera module 10G of this preferred embodiment includes peripheral circuit components 202g that are arranged in a first mounting portion 20G except for a region between the cavity 211 and the connecting portion 40. The other basic structure preferably is substantially the same as that of the camera module 10 described in the first preferred embodiment. Since the peripheral circuit components 202g are arranged in the first mounting portion 20G except for the region between the cavity 211 and the connecting portion 40, a wiring density in the region between the cavity 211 and the connecting portion 40 is reduced. Accordingly, the image sensor IC 60 and the peripheral circuit components 202g are more easily arranged in the first mounting portion 20G.

The first mounting portion 20G may include in a mixed fashion not only the peripheral circuit components 202g that are arranged at positions except for the region between the cavity 211 and the connecting portion 40, but also the peripheral circuit components 202c and 202s that are arranged in the region between the cavity 211 and the connecting portion 40. In such a case, the peripheral circuit components 202g are each preferably selected as a component having a larger number of terminals or a larger size.

The structure of the camera module 10G according to the eighth preferred embodiment can also be combined, as required or desired, with suitable one of the structures of the camera module and the electronic device according to any of the first to seventh preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A camera module comprising:
   a multilayer base body with a flat film configuration, and including a plurality of flexible base material layers;
   an image sensor IC including a light receiving element;
   a lens unit that condenses light to the light receiving element;
   peripheral circuit components that are connected to the image sensor IC and the lens unit; and
   a connector element configured to provide connection to outside; wherein
   the multilayer base body includes a first mounting portion, a second mounting portion, and a connecting portion interconnecting the first mounting portion and the second mounting portion, integrated together when looked at in a plan view;
   the multilayer base body includes a cavity in a first principal surface of the first mounting portion, and a penetration hole that penetrates from an inner bottom surface of the cavity to a second principal surface of the first mounting portion;
   the image sensor IC is arranged in the cavity with the light receiving element directed toward the second principal surface of the first mounting portion;
   the lens unit is arranged at a second principal surface side of the multilayer base body to be optically coupled to the light receiving element through the penetration hole;
   at least one of the peripheral circuit components is incorporated in a portion of the plurality of flexible base material layers of the first mounting portion of the multilayer base body;
   the portion of the plurality of flexible base material layers of the first mounting portion defines a sidewall of the cavity;
   each of the plurality of flexible base material layers in the portion are made of the same material;
   the connector element is arranged in the second mounting portion; and
   the first mounting portion is thicker than the connecting portion.

2. The camera module according to claim 1, wherein
   the plural flexible base material layers are made of thermoplastic resin; and
   the multilayer base body has an integrated structure in which the plural flexible base material layers are stacked and pressure-bonded without disposing an adhesive layer between the flexible base material layers.

3. The camera module according to claim 1, wherein a cover member covering an opening of the cavity is arranged in the first mounting portion.

4. The camera module according to claim 1, wherein at least one of the peripheral circuit components is incorporated in the first mounting portion at a position closer to the connecting portion than a position of the cavity.

5. The camera module according to claim 4, wherein the peripheral circuit component is incorporated in the first mounting portion near a boundary surface between the flexible base material layers, which are in common to both the first mounting portion and the connecting portion, and the flexible base material layers, which are not in common to both the first mounting portion and the connecting portion.

6. The camera module according to claim 5, wherein the peripheral circuit component is incorporated in the first mounting portion straddling the boundary surface between the flexible base material layers, which are in common to both the first mounting portion and the connecting portion, and the flexible base material layers, which are not in common to both the first mounting portion and the connecting portion.

7. The camera module according to claim 5, wherein the peripheral circuit component is incorporated in the first mounting portion in a state contacting the boundary surface between the flexible base material layers, which are in common to both the first mounting portion and the connecting portion, and the flexible base material layers, which are not in common to both the first mounting portion and the connecting portion.

8. The camera module according to claim 1, wherein at least one of the peripheral circuit components is arranged at a position except for a region between the cavity and the connecting portion when looking at the first mounting portion in a plan view.

9. The camera module according to claim 1, wherein the connecting portion includes:
   a first wiring section that connects at least one of the image sensor IC and the peripheral circuit component to the connector element;
   a second wiring section that is disposed at a position different from a position of the first wiring section in a thickness direction of the multilayer base body, and that connects at least one of the image sensor IC and the peripheral circuit component to the connector element; and
   a first ground conductor that is disposed between the first wiring section and the second wiring section, and that extends in opposing relation to the first wiring section and the second wiring section.

10. The camera module according to claim 9, wherein a transmission speed of a signal propagating through the first wiring section is different from a transmission speed of a signal propagating through the second wiring section.

11. The camera module according to claim 9, wherein
    the transmission speed of the signal propagating through the first wiring section is faster than the transmission speed of the signal propagating through the second wiring section; and
    a length of a transmission path for the signal propagating through the first wiring section is shorter than a length of a transmission path for the signal propagating through the second wiring section.

12. An electronic device comprising:
    the camera module according to claim 9;
    a mounting substrate that is connected to the camera module through the connector element; and
    a metal body that is disposed on the mounting substrate, and that is positioned close to the connecting portion; wherein a transmission speed of a signal propagating through the first wiring section is faster than a transmission speed of a signal propagating through the second wiring section; and the camera module includes a second ground conductor that is arranged at side closer to the metal body than the first wiring section and the first ground conductor, and that covers the first wiring portion.

13. An electronic device comprising:
the camera module according to claim 9;
a mounting substrate that is connected to the camera module through the connector element; and
a metal body that is disposed on the mounting substrate, and that is positioned close to the connecting portion; wherein
a transmission speed of a signal propagating through the first wiring section is faster than a transmission speed of a signal propagating through the second wiring section; and
the first wiring section is positioned farther away from the metal body than the second wiring section.

14. A camera module comprising:
a multilayer base body with a flat film configuration, and including a plurality of flexible base material layers;
an image sensor IC including a light receiving element;
a lens unit that condenses light to the light receiving element;
peripheral circuit components that are connected to the image sensor IC and the lens unit; and
a connector element configured to provide connection to outside; wherein
the multilayer base body includes a first mounting portion, a second mounting portion, and a connecting portion interconnecting the first mounting portion and the second mounting portion, integrated together when looked at in a plan view;
the multilayer base body includes a cavity in a first principal surface of the first mounting portion, and a penetration hole that penetrates from an inner bottom surface of the cavity to a second principal surface of the first mounting portion;
the image sensor IC is arranged in the cavity with the light receiving element directed toward the other principal surface of the first mounting portion;
the lens unit is arranged at a second principal surface side of the multilayer base body to be optically coupled to the light receiving element through the penetration hole;
at least one of the peripheral circuit components is incorporated in a portion of the plurality of flexible base material layers of the first mounting portion of the multilayer base body;
the portion of the plurality of flexible base material layers of the first mounting portion defines a sidewall of the cavity;
each of the plurality of flexible base material layers in the portion are made of the same material;
the connector element is arranged in the second mounting portion; and
the at least one of the peripheral circuit components is incorporated in the multilayer base body in the first mounting portion at a position opposing to the image sensor IC in a thickness direction of the multilayer base body.

15. The camera module according to claim 14, wherein at least one of the peripheral circuit components is arranged at a position except for a region between the cavity and the connecting portion when looking at the first mounting portion in a plan view.

16. The camera module according to claim 14, wherein the connecting portion includes:
a first wiring section that connects at least one of the image sensor IC and the peripheral circuit component to the connector element;
a second wiring section that is disposed at a position different from a position of the first wiring section in a thickness direction of the multilayer base body, and that connects at least one of the image sensor IC and the peripheral circuit component to the connector element; and
a first ground conductor that is disposed between the first wiring section and the second wiring section, and that extends in opposing relation to the first wiring section and the second wiring section.

17. The camera module according to claim 16, wherein a transmission speed of a signal propagating through the first wiring section is different from a transmission speed of a signal propagating through the second wiring section.

18. The camera module according to claim 16, wherein
the transmission speed of the signal propagating through the first wiring section is faster than the transmission speed of the signal propagating through the second wiring section; and
a length of a transmission path for the signal propagating through the first wiring section is shorter than a length of a transmission path for the signal propagating through the second wiring section.

19. An electronic device comprising:
the camera module according to claim 16;
a mounting substrate that is connected to the camera module through the connector element; and
a metal body that is disposed on the mounting substrate, and that is positioned close to the connecting portion; wherein
a transmission speed of a signal propagating through the first wiring section is faster than a transmission speed of a signal propagating through the second wiring section; and
the camera module includes a second ground conductor that is arranged at side closer to the metal body than the first wiring section and the first ground conductor, and that covers the first wiring portion.

20. An electronic device comprising:
the camera module according to claim 16;
a mounting substrate that is connected to the camera module through the connector element; and
a metal body that is disposed on the mounting substrate, and that is positioned close to the connecting portion; wherein
a transmission speed of a signal propagating through the first wiring section is faster than a transmission speed of a signal propagating through the second wiring section; and
the first wiring section is positioned farther away from the metal body than the second wiring section.

* * * * *